United States Patent
Gwinn, IV

(10) Patent No.: US 11,082,186 B2
(45) Date of Patent: Aug. 3, 2021

(54) PHASED ARRAY ANTENNA SYSTEM

(71) Applicant: Raytheon Company, Waltham, MA (US)

(72) Inventor: Joseph M. Gwinn, IV, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/583,207

(22) Filed: Sep. 25, 2019

(65) Prior Publication Data

US 2021/0091908 A1  Mar. 25, 2021

(51) Int. Cl.
*H04L 5/00* (2006.01)
*H01Q 21/29* (2006.01)

(52) U.S. Cl.
CPC ......... *H04L 5/0053* (2013.01); *H01Q 21/293* (2013.01); *H04L 5/0062* (2013.01)

(58) Field of Classification Search
CPC ...... H01Q 3/30; H01Q 21/293; H04L 5/0053; H04L 5/0062; H04L 27/261
See application file for complete search history.

(56) References Cited

U.S. PATENT DOCUMENTS

| | | | |
|---|---|---|---|
| 3,750,178 A | 7/1973 | Hulst | |
| 4,647,868 A | 3/1987 | Mueller | |
| 4,649,393 A | 3/1987 | Rittenbach | |
| 4,760,397 A | 7/1988 | Piccolruaz | |
| 5,248,982 A | 9/1993 | Reinhardt et al. | |
| 5,623,270 A * | 4/1997 | Kempkes | H01Q 1/005 342/174 |
| 5,671,168 A | 9/1997 | Liu et al. | |
| 8,730,097 B1 | 5/2014 | Uscinowicz | |
| 9,261,587 B1 | 2/2016 | Gwinn, IV et al. | |
| 2006/0006946 A1 | 1/2006 | Burns et al. | |
| 2009/0086867 A1 | 4/2009 | Banu et al. | |
| 2011/0133982 A1 * | 6/2011 | Goshen | G01S 7/4004 342/174 |
| 2012/0142280 A1 | 6/2012 | Bann et al. | |

(Continued)

OTHER PUBLICATIONS

Alder, A Study of Locking Phenomena in Oscillators, Proceeding of the IEEE, Oct. 1973, vol. 61, No. 10, pp. 1380-1385, Institute of Electrical and Electronics Engineers, New York City, NY.

(Continued)

*Primary Examiner* — Gary Mui

(57) ABSTRACT

A reference signal distribution system is disclosed. The reference signal distribution system can include a power splitter to create, from a frequency-divided reference signal, a counterclockwise divided reference signal and a clockwise divided reference signal. The reference signal distribution system can include a distribution ring to provide the counterclockwise divided reference signal to a ring tap, and provide the clockwise divided reference signal to the ring tap. The reference signal distribution system can include a ring tap to produce a phase synchronization signal based the counterclockwise divided reference signal and the clockwise divided reference signal. The reference signal distribution system can include an analog regenerative frequency divider to produce a common phase reference signal based in part on the phase synchronization signal.

23 Claims, 6 Drawing Sheets

(56) References Cited

U.S. PATENT DOCUMENTS

| | | | |
|---|---|---|---|
| 2015/0162875 A1 | 6/2015 | Patrizi | |
| 2016/0218429 A1* | 7/2016 | Klemes | C02F 1/4695 |
| 2016/0380711 A1* | 12/2016 | Feigin | H01Q 3/30 |
| | | | 342/174 |
| 2017/0025749 A1 | 1/2017 | Frye et al. | |
| 2017/0077611 A1* | 3/2017 | Zou | H01Q 3/28 |
| 2017/0257240 A1* | 9/2017 | Ma | H04L 27/14 |
| 2019/0386391 A1* | 12/2019 | Doak | G01S 13/347 |

OTHER PUBLICATIONS

Bhansali et al., Gen-Adler: The Generalized Adler's Equation for Injection Locking Analysis in Oscillators, Proceedings of the 14th Asia South Pacific Design Automation Conference, 2009, 6 pages, Japan.

Brillouin, Wave Propagation in Periodic Structures, 1946, 258 pages, McGraw-Hill Book Co., Inc., New York, NY and London.

Miller, Fractional-Frequency Generators Utilizing Regenerative Modulation, Procedings of the I. R. E., Jul. 1939, pp. 446-457, vol. 27, Issue 7, Institute of Electrical and Electronics Engineers, New York City, NY.

Nagurney, A Multi-Emission Frequency Domain Modulator, Vehicular Technology Conference, 1990, 4 pages, Institute of Electrical and Electronics Engineers, New York City, NY.

Thian et al., Integrated Low-Loss Passive SiGe Power Splitter and Combiner Operating Across 78-86 GHz Band, Bipolar/BiCMOS Circuits and Technology Meeting, 2013, 4 pages, Institute of Electrical and Electronics Engineers, New York City, NY.

Collin, Periodic Structures and Filters, Foundations for Microwave Engineering, 2001, 122 pages, Chapter 8, Wiley-IEEE Press, United States.

Dreher et al., Antenna and Receiver System With Digital Beamforming for Satellite Navigation and Communications, IEEE Transactions on Microwave Theory and Techniques, Jul. 9, 2003, 7 pages, vol. 51, Issue 7, IEEE, New York, NY.

Eber, Digital Beam Steering Antenna, May 1988, 148 pages, United States Air Force, United States.

Herd, Experimental Results from a Self-Calibrating Digital Beamforming Array, IEEE Antennas and Propagation International Symposium Digest, 1990, 4 pages, IEEE, New York, NY.

Mini-Circuits, Directional Couplers, https://www.minicircuits.com/app/COUP7-2.pdf, last updated Sep. 9, 1999, 6 pages, Mini-Circuits, United States.

Rubiola, Tutorial on the double balanced mixer, https://arxiv.org/abs/physics/0608211, Aug. 21, 2006, 52 pages, FEMTO-ST Institute, France.

International Search Report for International Application No. PCT/US2020/043332 dated Oct. 28, 2020, 12 pages.

* cited by examiner

PHASED ARRAY ANTENNA SYSTEM

BACKGROUND

A phased antenna array is an array antenna whose radiators can be fed with different phase shifts, such that a common antenna pattern can be steered electronically. For example, a computer-controlled array of antennas can create a beam of waves that are capable of being electronically steered to point in different directions without physically moving the antennas. In the phased antenna array, power from a transmitter can be fed to the antennas through phase shifters, which can be controlled by a computer. The phase shifter can alter the phase electronically, thus steering the beam of waves to a different direction. By changing phase shifts, the computer can change the pointing angle of the beam.

Phased array antennas can include tens, hundreds or sometimes tens of thousands of individual antenna elements to achieve increased gain, and phased array antennas can be used at in radar, sonar, data communications, and other applications.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
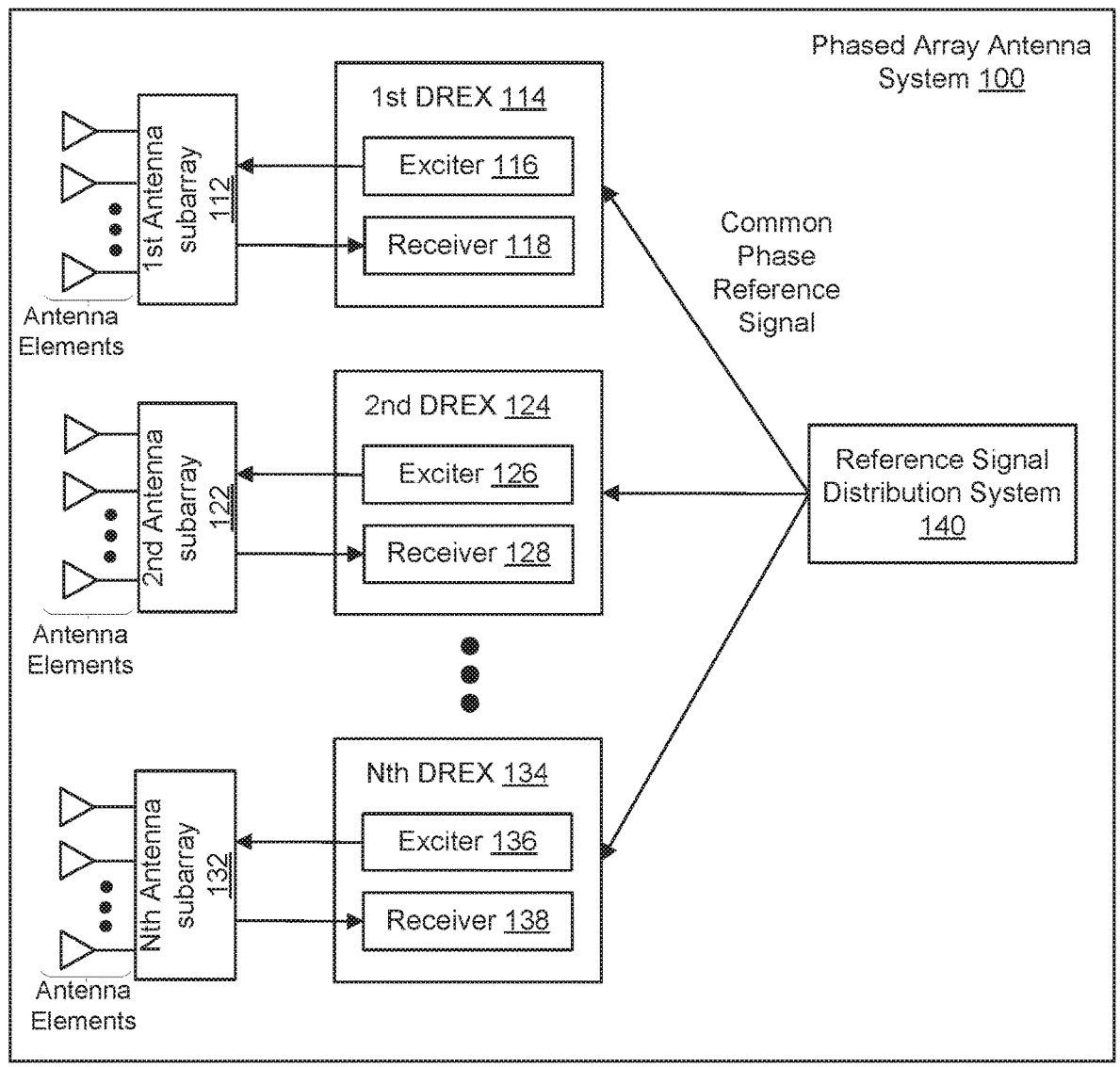
FIG. 1 illustrates a phased array antenna system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly; but is not intended to identify key features or essential features of the technology nor is it intended to limit the scope of the claimed subject matter.

Principles of Operation

In one configuration, first-order theory can neglect practical issues as the finite directivity of directional couplers, the finite isolation between mixer ports, imperfect impedance matching, and the complications of practical mixers. With respect to a single ring-tap output assembly (which includes a coupler, mixer, and band-pass filter) somewhere in a coaxial cable ring (also referred to as a distribution ring) of circumference c, a clockwise distance from a power splitter to a ring-tap directional coupler of interest is represented by a, and a counterclockwise distance is represented by b, such that a+b=c, where the distances are in meters. The output assembly can alternatively be in a fiber-optical transmission media carrying RF-modulated light, or free-space optical beams. Moreover, the coaxial cable ring discussed above need not be round, so long as it has a defined perimeter length.

In one example, an angular frequency of a reference signal on the coaxial cable ring is represented by $\omega$ and is expressed in radians per second ($\omega=2\pi(f/4)$). A propagation delay constant of the coaxial cable is $\delta$ seconds per meter. As a non-limiting example, the propagation delay constant of the coaxial cable can be 4 nanoseconds per meter. A voltage attenuation constant k of the coaxial cable is expressed in Nepers per meter. If k=0, the coaxial cable is lossless.

In one example, there can be two counter-rotating reference signals, where one signal can be propagating CW and the other signal can be propagating CCW. For the two counter-rotating reference signals, the corresponding voltage-versus-time functions on the coaxial cable ring at a location of the ring-tap (and its directional coupler) is expressed as follows:

$$S_{cw}=e^{-ka} \cos[\omega(t-\delta a)]$$

$$S_{ccw}=e^{-kb} \cos[\omega(t-\delta b)]$$

In one example, multiplying these two counter-rotating reference signals together (i.e., multiplying Scw and Sccw) point-by-point and simplifying yields the following mixer output function:

$$S_{mix} = \frac{e^{-ck}}{2}(\cos[(b-a)\delta\omega] + \cos[\omega(2t-\delta c)])$$

The mixer output function includes a first term of $e^{-ck}/2$, a second term of $\cos[(b-a)\delta\omega]$, and a third term of $\cos[\omega(2t-\delta c)]$.

In one example, the first term $e^{-ck}/2$ is a theoretical attenuation from the power splitter output to a ring-tap mixer output, while ignoring mixer practicalities. The attenuation is a function of a ring circumference and cable properties alone, and not of the location in the coaxial cable ring at which the ring-tap (and thus its directional coupler) is installed.

In one example, the second term $\cos[(b-a)\delta\omega]$ is not a function of time, and so is a DC offset that varies periodically around the coaxial cable ring. This second term is rejected by a band pass filter (or alternately a high pass filter) in the ring tap.

In one example, the third term $\cos[\omega(2t-\delta c)]$ is a function of time, and is a sinewave at twice an original signal frequency with a delay that is a function of the ring circumference and cable properties alone, and not of location in the coaxial cable ring at which the ring-tap directional coupler is installed.

This constancy holds regardless of a number of reference-signal cycles stored in the coaxial cable ring, even as this number changes with changes in coaxial cable ring temperature. In other words, there is no "2π radian (360°) ambiguity" on the coaxial cable ring, nor is there a π radian ambiguity (sign reversal) if all ring taps are installed in the coaxial cable ring with a same orientation. This 2ω signal passes through the band pass filter and is delivered to an output, while the DC offset is rejected by the bandpass filter.

In one example, a final output function of the single ring-tap output assembly is represented as follows:

$$Smixref = \frac{e^{-ck}}{2} \cos[\omega(2t - \delta c)].$$

In one example, given that the coaxial cable ring is composed of a collection of cables, couplers, and a power splitter (which are passive components), the circumference of the coaxial cable ring is stable, and even if a section of the coaxial cable ring changes length (e.g., due to a local increase in temperature), the time delay change is the same regardless of the location in the coaxial cable ring at which the ring-tap directional coupler is installed.

In one example, the CW and CCW signals are simultaneously present, but this is not limiting. In some cases, having simultaneously present CW and COW signals leads to practical difficulties when there are an increased number of ring taps per distribution ring. In this case, directionality limitations of practical directional couplers causes excessive phase-angle errors. One remedy is to send the CW and CCW signals in time alternation, using a standard coherent oscillator (COHO), to remember a phase of the reference signal not currently being received, and providing a signal with this phase to the mixer in lieu of the missing CW/CCW signal. Another option is to use two COHOs, one per direction, which are refreshed in alternation, when data for a particular direction is available. One can determine which direction is currently being transmitted by comparing the received power levels of the clockwise and counterclockwise signals with each another.

In one configuration, the CW and CCW signal phases are measured directly as in-phase and quadrature (I&Q) values. Later, complex-arithmetic calculations are performed to recover a constant phase. In this case, the constant phase is used and a time offset is not measured.

In one configuration, the analog regenerative frequency dividers utilize a divide-by-two divisor. However, this is not intended to be limiting, as the analog regenerative frequency dividers can utilize a divide-by-three divisor, a divide-by-four divisor, divide-by-five divisor, and so on. Note that if the divisor is N, an unsynchronized f/N frequency divider can come up in any of N different phases and will do so at random, yielding N ambiguous phases separated by integer multiples of (2π)/N radians.

In one configuration, the coaxial cable ring uses two cables, where a first cable is used for CW and a second cable is used for CCW. This approach may improve isolation between the CW and CCW signals, but can necessitate careful matching of cable pairs to ensure that both cables for the coaxial cable ring have the same delay between ring tap pairs.

In one configuration, the injection signal (or the f/2 phase-synchronization signal) is provided to an otherwise unused port of the directional coupler in the analog regenerative frequency divider. However, the injection signal (or the f/2 phase-synchronization signal) may instead be provided to other locations in the oscillator feedback loop of the analog regenerative frequency divider.

A Reference Signal Distribution System in a Phased Array Antenna System

In one configuration, in a phased-array system, antenna array elements of the system operate in unison with a controlled phase. For example, radio frequency (RF) waveforms generated and provided to the antenna array elements can operate in unison by being in phase.

In prior phased-array systems, a single Receiver-Exciter (REX) unit would generate waveforms and a tree of cables, splitters and driver amplifiers would distribute the RF waveforms to an array face. In prior systems, references from which the RF waveforms were generated would be provided by a frequency time system or subsystem (FTS) unit situated in proximity to various REX units. In prior systems, there would be one REX unit per array face, plus a backup REX unit for redundancy.

In modern phased-array systems, the one REX unit per array face has been replaced by multiple Distributed REX (DREX) units embedded directly in an array of antenna elements. The DREXs can generate reference signals used internally from at least a single frequency and phase reference provided by a common source, such as a frequency time source or system (FTS). One advantage of parallel generation of reference signals in the DREXs is that the noise generated by independently-operated generation circuitry is uncorrelated, and so combines as power, not voltage. To ensure that the DREXs generate the reference signals internally with a same phase, a common phase reference can be provided to the DREXs. For example, the common phase reference can be useful when the DREXs contain frequency divider circuits, which can cause a random phase ambiguity to occur unless synchronized.

In past solutions with respect to modern systems, a dedicated reference distribution system with controlled path lengths can be used, in which cables can be trimmed to specific insertion phases at multiple RF test frequencies. One example of the dedicated reference distribution system is a pilot pulse distribution system. The dedicated reference distribution system is expensive and it can be difficult to maintain accurate compensation for temperature variation and aging.

In further past solutions with respect to modern systems, a pair of counter-rotating or counter-propagating reference signals or linear frequency modulation (LFM) chirps can be used. The mathematical complex product of the pair of counter-rotating or counter-propagating reference signals, for instance LFM chirps, can have a constant phase. An advantage of the counter-rotating or counter-propagating reference signal approach is that a cable plant is not required to be carefully built, or cut to precise electrical lengths and/or be individually measured and compensated for mathematically. However; this approach may yield phase ambiguities (e.g., 180 degree ambiguities), and it is desirable to eliminate these ambiguities.

Further, in the past solutions with respect to modern systems described above, frequency dividers used to generate the various reference signal frequencies are implemented digitally. While convenient and easily synchronized, digital dividers are noisier than analog regenerative frequency dividers.

In the present technology, analog regenerative frequency dividers can be synchronized to achieve the same phase across an array face (i.e., a face of an array of antenna elements), with low phase noise compared to digital frequency dividers. The low phase noise is beneficial to the overall system performance. For example, with a higher phase noise, detection of return signals can become more difficult as the return signals can be masked by the higher phase noise. Therefore, the low phase noise produced by the analog regenerative frequency dividers can improve signal detection. Analog regenerative frequency dividers can be a form of an electronic feedback oscillator, such that the analog regenerative frequency dividers can be synchronized by injection of a reference signal. More specifically, the analog regenerative frequency dividers can be synchronized using a counter-rotating reference signal on a ring cable, which can provide an injection signal having a constant phase. This approach of analog regenerative frequency divider synchronization using the counter-rotating reference signal on the ring cable can be applicable to phased array antenna systems (e.g., phased array antennas used in wireless communication systems) that include analog regenerative frequency dividers. The present constant-phase approach may also be used to synchronize digital dividers. Further, this approach does not involve having precision components or manufacturing techniques, or recalibration necessitated by aging. Thus, in the present technology, an identical or near-identical phase can be achieved across the array face by injection-locking the analog regenerative frequency dividers in parallel, without the difficulty and expense of exact phase-matching of cables and maintaining the match over age and temperature.

A technology is provided to synchronize multiple distributed analog frequency dividers to prevent phase ambiguities, without the need for a precision divided-frequency reference distribution system. This is accomplished by using a signal distribution ring using counter-rotating reference signals to distribute a fractional-frequency reference signal that is multiplied back up to the desired frequency with constant phase, this being used to synchronize the analog frequency dividers by injection locking.

FIG. 1 illustrates an example of a phased array antenna system 100. The phased array antenna system 100 can be included in phased array antennas used in a communication system (e.g., a Fifth Generation (5G) communication system), radar system, sonar system, and others. The phased array antenna system 100 can include a plurality of antennas, such as a first antenna 112, a second antenna 122 and an Nth antenna 132, where N is a positive integer. The phased array antenna system 100 can include a plurality of DREXs, where a given DREX can be communicatively coupled to a given antenna. For example, a first DREX 114 can be communicatively coupled to the first antenna 112, a second DREX 124 can be communicatively coupled to the second antenna 122, and a third DREX 134 can be communicatively coupled to the third antenna 132. The first DREX 114 can include a first exciter 116 and a first receiver 118, the second DREX 124 can include a second exciter 126 and a second receiver 128, and the Nth DREX 134 can include an Nth exciter 136 and an Nth receiver 138.

Although FIG. 1 depicts a phased array antenna system having one antenna subarray (112, 122, 132) per DREX (114, 124, 134), this is for visual simplicity. One can have one DREX for all antenna subarrays, or multiple DREXs per antenna subarray, or any combination thereof. A subarray is a collection of antenna array elements. An antenna element is an actual antenna radiator. For example, one can have ten thousand of these, collected in for instance 100 subarrays, each having 100 elements apiece.

In one configuration, the phased array antenna system 100 can include a reference signal distribution system 140. The reference signal distribution system 140 can provide a common phase reference signal to each of the DREXs, such as the first DREX 114, the second DREX 124, and the third DREX 134. The common phase reference signals can be reference signals having a common phase. The DREXs can each generate internal signals with a same phase using the common phase reference signal provided from the reference signal distribution system 140. In other words, the reference signal distribution system 140 can serve as a common source to provide the common phase reference signal to each of the DREXs in the phased array antenna system 100, such that each of the DREXs can generate the internal signals with the same phase.

Figure 2:
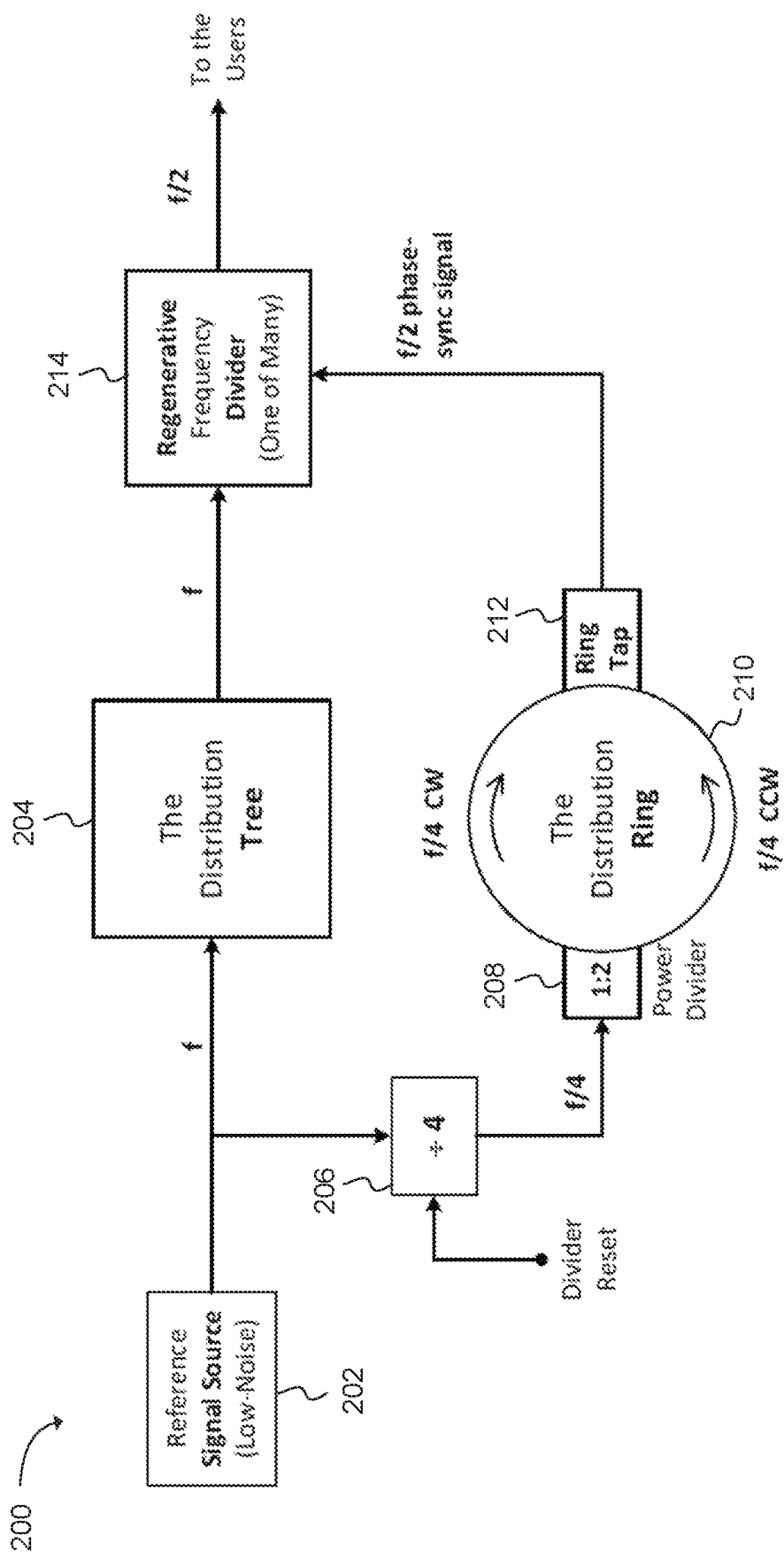
FIG. 2 illustrates a reference signal distribution system of a phased array antenna system in accordance with an example.

FIG. 2 illustrates an example of a reference signal distribution system 200 of a phased array antenna system. The reference signal distribution system 200 can provide a common phase reference signal, which can be sent to a plurality of DREXs in the phased array antenna system. For example, the reference signal distribution system 200 can be communicatively coupled to a plurality of DREXs in the phased array antenna system. As described in further detail below, the reference signal distribution system 200 can include a reference signal source 202, a distribution tree 204, a frequency divider 206 (e.g., a f/4 frequency divider), a power splitter 208 (e.g., a RF component that performs 1:2 power division), a distribution ring 210 (also referred to as a coaxial cable ring), ring tap(s) 212, and a plurality of analog regenerative frequency dividers 214.

In one example, the reference signal source 202 can be a low-noise reference signal source. In other words, the reference signal source 202 can provide a reference signal having a low phase noise. There is typically one reference signal source 202 per phased array antenna system, but this is not intended to be limiting as multiple parallel reference signal sources per phased array antenna system is contemplated. The reference signal source 202 can provide a reference signal having a frequency f. The reference signal source 202 can drive the distribution tree 204, as well as the distribution ring 210 through the frequency divider 206.

In one example, the distribution tree 204 can receive a reference signal having a frequency f (e.g., the reference signal having the low phase noise) from the reference signal source 202, and the distribution tree 204 can provide a copy of the reference signal having the frequency f to each of the plurality of analog regenerative frequency dividers 214 in the phased array antenna system. The distribution tree 204 can be implemented using passive components, for reliability, and if passive they need not be redundant.

In one example, the frequency divider 206 can receive the reference signal having the frequency f (e.g., the reference signal having the low phase noise) from the reference signal source 202. In this example, the frequency divider 206 can be an f/4 frequency divider. In other words, in this example, the frequency divider 206 can receive the reference signal having the frequency f as an input, and produce an output of a reference signal having a frequency f/4. The frequency divider 206 can reduce the frequency of the reference signal (e.g., reducing from f to f/4) before distribution, in order to compensate for later frequency doubling by the ring tap(s) 212.

In one example, the reference signal having the frequency f/4 that is outputted from the frequency divider 206 can be provided to the power splitter 208, and then to the distribution ring 210. The distribution ring 210 can be implemented using passive components, for reliability, and if passive need not be redundant. The distribution ring 210 can carry the reference signal having the frequency f/4 to the ring tap(s) 212 in the distribution ring 210. For example, the reference signal having the frequency f/4 can be carried to the ring tap(s) 212 using a pair of identical signals that propagate in opposite directions around the distribution ring 210, where one signal can travel clockwise (CW) and another signal can travel counterclockwise (CCW), while both signals are in a same physical cable, such as a coaxial or other cable. In other words, the distribution ring 210 can carry a CW reference signal having the frequency f/4 (also referred to herein as a CW divided reference signal) and a CCW reference signal having the frequency f/4 (also referred to herein as a CCW divided reference signal) to the ring tap(s) 212 in the distribution ring 210.

In one example, the ring tap(s) 212 can receive the CW reference signal having the frequency f/4 and the CCW reference signal having the frequency f/4, and can yield a reference signal of frequency f/2 having a known common phase (or constant phase). In other words, the ring tap(s) 212 can produce an f/2 phase-synchronization signal, which can be provided to each of the plurality of analog regenerative frequency dividers 214. The f/2 phase-synchronization signal can serve to synchronize each of the plurality of analog regenerative frequency dividers 214 to a common phase. The f/2 phase-synchronization signal can be at a desired reference frequency with no 180 degree phase ambiguities.

In one example, a given analog regenerative frequency divider 214 can receive the f/2 phase-synchronization signal from a corresponding ring tap 212. Further, the given analog regenerative frequency divider 214 can receive the reference signal having the frequency f from the distribution tree 204. The f/2 phase-synchronization signal and the reference signal having the frequency f can be provided as inputs to the analog regenerative frequency divider 214, and an output of the analog regenerative frequency divider 214 can be a signal having a frequency f/2 (also referred to herein as a common phase reference signal).

In one example, since the input of the f/2 phase-synchronization signal has a common phase, the output of the signal having the frequency f/2 can also have a common phase. The signal having the frequency f/2 can be provided to users, such as a corresponding DREX in the phased array antenna system. Further, since the signal having the frequency f/2 from each of the plurality of analog regenerative frequency dividers 214 can have the common phase, corresponding DREXs in the phased array antenna system can also receive signals having the frequency f/2 with the common phase.

In one example, the distribution ring 210 can include a plurality of ring taps 212, where a given ring tap 212 can correspond with a given analog regenerative frequency divider 214, which can correspond to a given DREX in the phased array antenna system. In other words, there can be a one-to-one ratio between the ring tap(s) 212, the analog regenerative frequency divider(s) 214 and the DREX(s) in the phased array antenna system.

In one example, when there are multiple distribution rings 210 being driven from a common reference frequency source, such as the reference signal source 202, and there are multiple frequency dividers 206 (e.g., multiple f/4 frequency dividers) in parallel, the multiple frequency dividers 206 can be synchronized using a divider reset control line. In one example, the frequency dividers 206 can be digital frequency dividers.

Figure 3:
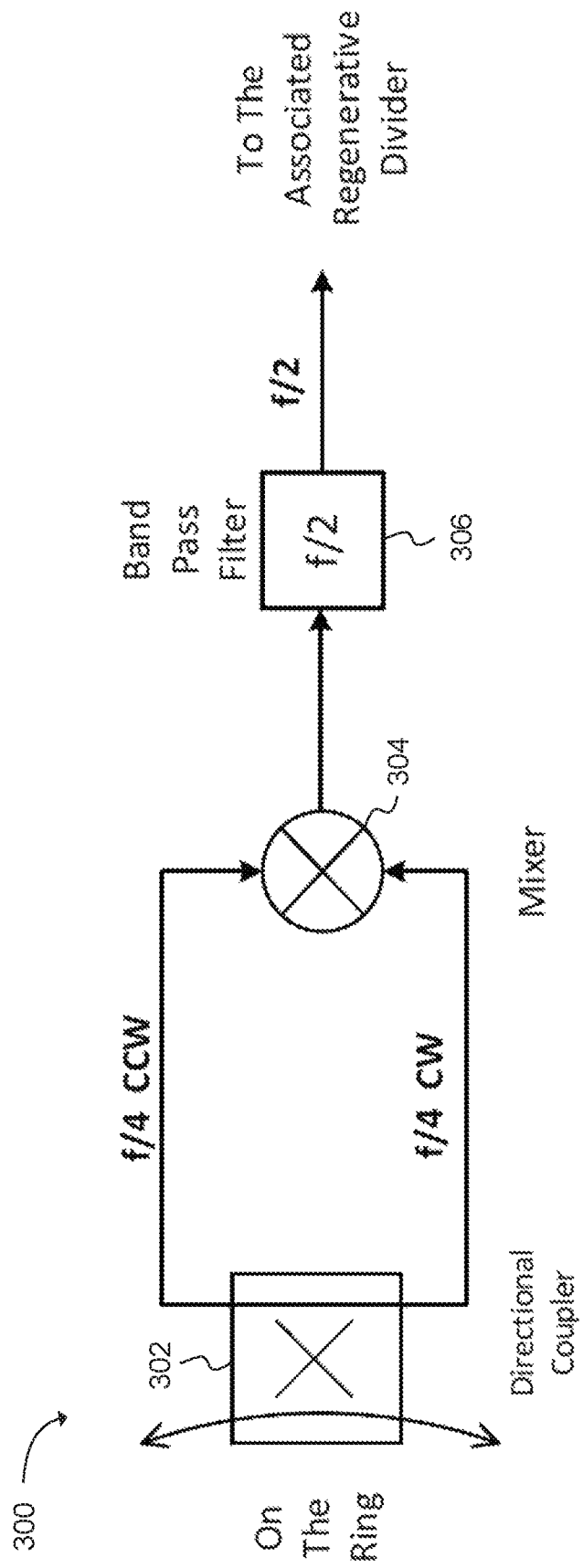
FIG. 3 illustrates a ring tap of a reference signal distribution system in accordance with an example.

FIG. 3 illustrates an example of a ring tap 300 of a reference signal distribution system. The ring tap 300 can include a directional coupler 302, a mixer 304 and a bandpass filter 306 (e.g., an f/2 bandpass filter). The ring tap 300 can be one of multiple ring taps that are inserted into a distribution ring of the reference signal distribution system.

In one example, the directional coupler 302 included in the ring tap 300 can provide a CW reference signal having the frequency f/4 and a CCW reference signal having the frequency f/4 to the mixer 304. The mixer 304 can combine the CW and CCW reference signals of frequency f/4, and yield a direct current (DC) offset that varies with the position around the distribution ring. Further, the CW and CCW reference signals of frequency f/4 can be combined to produce a (2×f/4), or f/2, reference signal (also referred to herein as a combined divided reference signal). The reference signal of frequency f/2 produced by the mixer 304 can have a phase that depends on the circumference of the distribution ring and not the location within the distribution ring in which the ring tap 300 resides.

In one example, the reference signal of frequency f/2 produced by the mixer 304 can be provided to the bandpass filter 306. The bandpass filter 306 can eliminate the DC offset and reduce random noise, thereby providing an f/2 phase-synchronization signal. The f/2 phase-synchronization signal can be provided to an associated analog regenerative frequency divider for injection locking.

In one example, if the distribution ring was instead driven at a reference signal of frequency f/2, the result would be a reference frequency of frequency f, and a post-distribution frequency division would have been needed. This approach would suffer from the same kind of phase ambiguity as that in the analog regenerative frequency divider.

In the present technology, performing the frequency division closer to a reference signal source, prior to distribution, needs only frequency multiplication to be performed in or after a reference signal distribution system, which is advantageous because frequency multiplication is not phase ambiguous.

Figure 4:
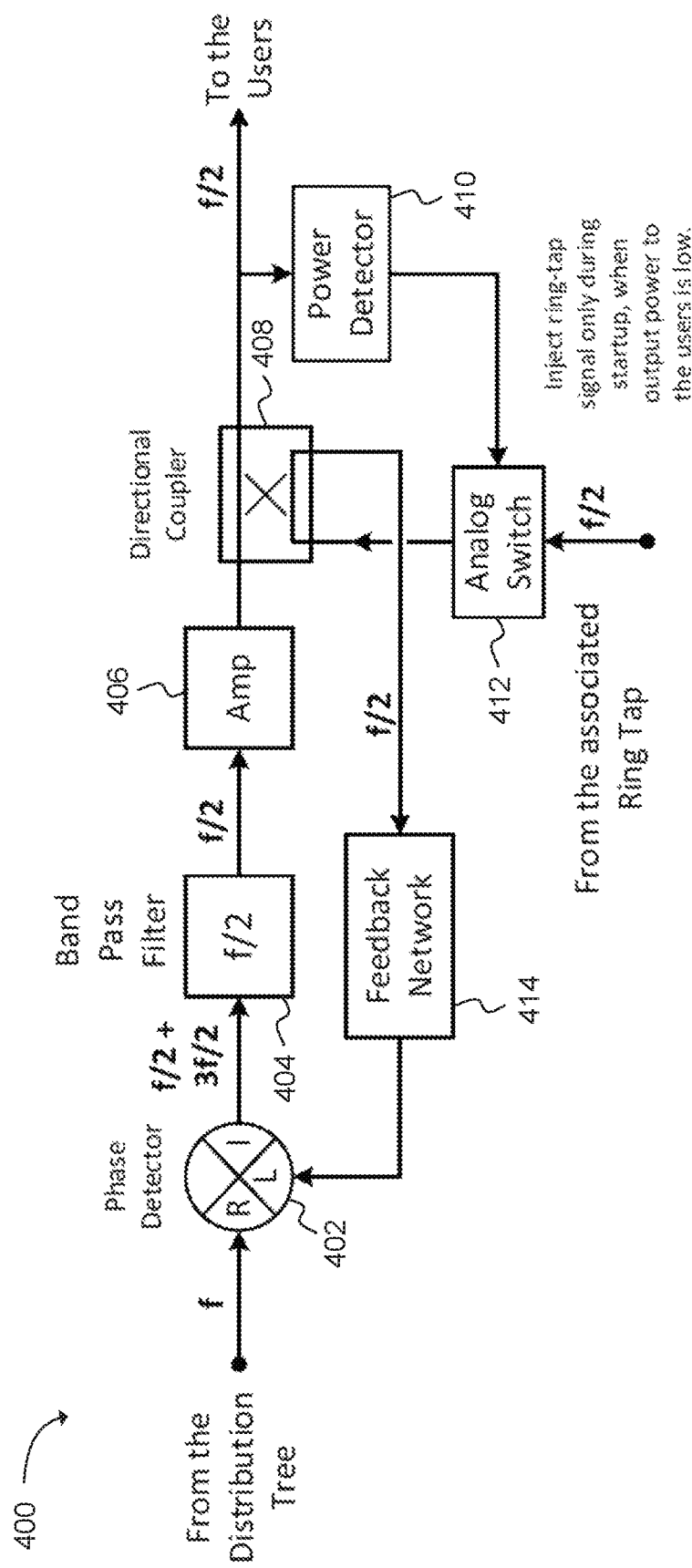
FIG. 4 illustrates an analog regenerative frequency divider of a reference signal distribution system in accordance with an example.

FIG. 4 illustrates an example of an analog regenerative frequency divider 400 of a reference signal distribution system. The analog regenerative frequency divider 400 can be one of multiple analog regenerative frequency dividers per a distribution ring of the reference signal distribution system. The analog regenerative frequency divider 400 can include a phase detector 402, a bandpass filter 404 (e.g., an f/2 bandpass filter), an amplifier 406, a directional coupler 408, a power detector 410, an analog switch 412, and a feedback network 414. The analog regenerative frequency divider 400 can include new components that are not found in standard analog regenerative frequency dividers, such as the power detector 410 and the analog switch 412. Further, the analog regenerative frequency divider 400 can implement a new use for the directional coupler 408, which is not found in standard analog regenerative frequency dividers.

In one example, a reference signal of frequency f can be received at the phase detector 402 from a distribution tree in the reference signal distribution system. Further, an f/2 phase-synchronization signal can be received at the directional coupler 408 via the analog switch 412 from an associated ring tap in the reference signal distribution system. The f/2 phase-synchronization signal can be received at the directional coupler 408 when the analog switch 412 is closed. The f/2 phase-synchronization signal can be directed from the directional coupler 408 to the feedback network 414, and then the f/2 phase-synchronization signal can be directed to the phase detector 402.

In one example, the phase detector 402 can receive the reference signal of frequency f and the f/2 phase-synchronization signal. The phase detector 402 can perform a frequency sum and difference operation on the reference signal of frequency f and the f/2 phase-synchronization signal. Thus, the phase detector 402 can produce an f/2 signal and a 3f/2 signal. The f/2 signal and the 3f/2 signal can be provided to the bandpass filter 404. In this example, the bandpass filter 404 can be an f/2 bandpass filter. Thus, in this example, the 3f/2 signal can be rejected and the f/2 signal can pass through the bandpass filter 404 and be provided to the amplifier 406. The f/2 signal from the amplifier can be provided to the directional coupler 408, and then to users, such as a corresponding DREX in the phased array antenna system.

In one example, the directional coupler 408 can serve two functions. A first function of the directional coupler 408 can be to extract a portion of the f/2 signal from the amplifier to feed back to the phase detector 402 via the feedback network 414. A second function of the directional coupler 408 can be to serve as an injection port for injection-locking of that same oscillating loop, which can take advantage of reduced loss existing between coupler ports. Thus, with respect to the second function, the directional coupler 408 can provide an output signal from the amplifier 406 to the power detector 410 and the analog switch 412, and then to the phase detector 402 via the feedback network 414. When the output signal has a frequency f/2, the signal of frequency f/2 can be provided to the users, such as the corresponding DREX in the phased array antenna system. In other words, the power detector 410 can be used to measure the power level of the output signal.

In one example, when the analog regenerative frequency divider 400 is starting up, there can initially be an approximately zero output signal (i.e., an output signal from the directional coupler 408), but sufficient loop gain that ordinary noise will be amplified time and time again as the amplified noise circulates around the oscillator loop of the analog regenerative frequency divider 400 until the oscillation amplitude is limited by a circuit component in the analog regenerative frequency divider 400. When a signal at a correct frequency (such as an injected signal) is provided at startup, an oscillation can grow from and thus be in phase with that injected signal, even if that signal is very faint. In this example, the injected signal can be the f/2 phase-synchronization signal provided by the ring tap.

In one example, once an oscillation of the correct phase is established (e.g., for f/2, there are two possibilities), further injection of the signal from the ring tap can be unneeded and can cause excess phase noise, so a manner to sharply reduce an injection signal amplitude is desired. The power detector 410 and the analog switch 412 can be used to reduce the injection signal amplitude. For example, when the oscillation amplitude is reduced or below a threshold, a power detector output can also be reduced and the analog switch 412 (also known as an analog transmission gate) can be set to transmit the injection signal at full design amplitude, thereby causing injection locking. The injection signal can be the f/2 phase-synchronization signal received from the associated ring tap. In other words, when the oscillation amplitude is below the defined threshold, the analog switch 412 can be closed and the injection signal can be provided to the directional coupler 408 and through the oscillation loop of the analog regenerative frequency divider 400. When the oscillation amplitude has been increased or is above a defined threshold for a defined period of time, the power detector output can also be increased. In this case, the analog switch 412 can block the injection signal (or the f/2 phase-synchronization signal from the associated ring tap), and typical self-sustaining regenerative divider operation can commence. In other words, when the oscillation amplitude is above the defined threshold, the analog switch 412 can be open and the injection signal is not provided to the directional coupler 408 or the oscillation loop of the analog regenerative frequency divider 400. If phase noise caused by a weak injected reference signal is not important, one may simply attenuate the incoming reference signal (from the associated ring tap), and feed this directly to the directional coupler 408, omitting the power detector 410 and the analog switch 412.

Thus, the injection signal (or the f/2 phase-synchronization signal) can be received from the ring tap only during a startup period. After the startup period and when the output power has stabilized near full power, the injection signal may not be received from the ring tap.

In one example, an output of the analog regenerative frequency divider 400 can be a signal having a frequency f/2. The signal having the frequency f/2 can be provided to users, such as a corresponding DREX in the phased array antenna system. Further, since the signal having the frequency f/2 from each of a plurality of analog regenerative frequency dividers can have a common phase, corresponding DREXs in the phased array antenna system can also receive signals having the frequency f/2 with the common phase.

Figure 5:
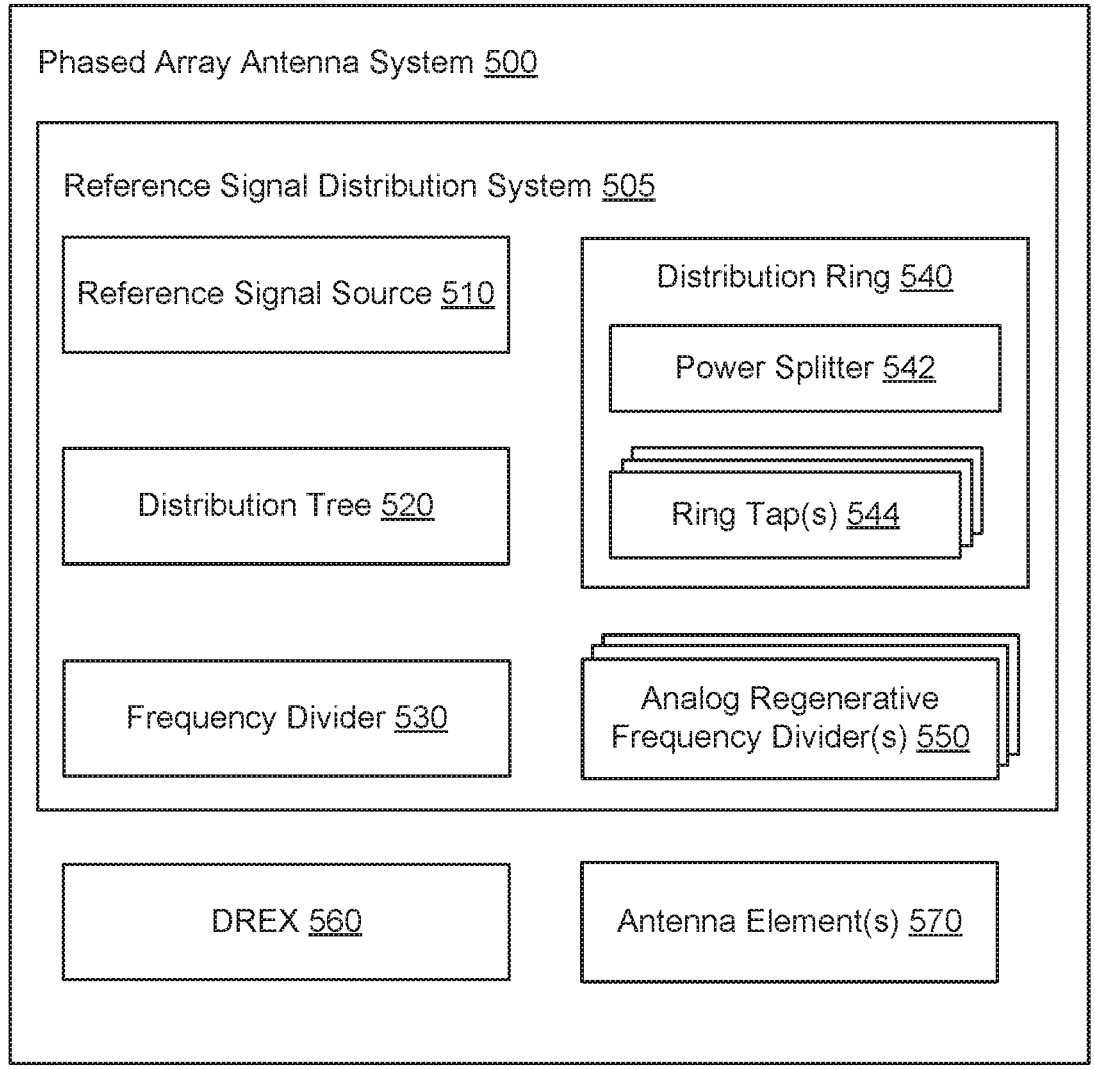
FIG. 5 illustrates a phased array antenna system in accordance with an example.

FIG. 5 illustrates an example of a phased array antenna system 500. The phased array antenna system 500 can include a reference signal source 510 configured to generate a reference signal. The phased array antenna system 500 can include a distribution tree 520 configured to receive the reference signal from the reference signal source 510 and provide a copy of the reference signal to an analog regenerative frequency divider 550. The phased array antenna system 500 can include a frequency divider 530 configured to divide the reference signal to produce a divided reference signal. The phased array antenna system 500 can include a distribution ring 540 that includes a power splitter 542 and ring tap(s) 544. The power splitter 542 can be configured to create, from the divided reference signal, a counterclockwise divided reference signal and a clockwise divided reference signal. The distribution ring 540 can provide the counterclockwise divided reference signal to the ring tap 544, and provide the clockwise divided reference signal to the ring tap 544. The ring tap 544 can be configured to produce a phase synchronization signal based on the counterclockwise divided reference signal and the clockwise divided reference signal. The analog regenerative frequency divider 550 can be configured to receive the phase synchronization signal and the reference signal and produce a common phase reference signal.

In one example, the reference signal source 510, the distribution tree 520, the frequency divider 530, the distribution ring 540 and the analog regenerative frequency divider 550 can be included in a reference signal distribution system 505 of the phased array antenna system 500.

In one configuration, the phased array antenna system 500 can include a distributed receiver-exciter (DREX) 560 and antenna element(s) 570. The DREX 560 can be configured to receive the common phase reference signal from the analog regenerative frequency divider 550 and generate an internal signal using the common phase reference signal. The antenna element 570 can be communicatively coupled to the DREX 560, and the antenna element 570 can be controlled using the internal signal generated at the DREX 560.

In one example, the reference signal can have a frequency f, the frequency divider can be a f/4 frequency divider, the counterclockwise divided reference signal can have a frequency f/4, the clockwise divided reference signal can have a frequency f/4, the phase synchronization signal can have a frequency f/2, and the common phase reference signal can have a frequency f/2, wherein f is a frequency in Hertz.

In one example, the ring tap 544 can include a directional coupler, a mixer and a bandpass filter. The directional coupler can be configured to direct the counterclockwise divided reference signal and the clockwise divided reference signal to the mixer. The mixer can be configured to combine the counterclockwise divided reference signal and the clockwise divided reference signal to produce a combined divided reference signal. The bandpass filter can be configured to filter the combined divided reference signal to produce the phase synchronization signal.

In one example, the analog regenerative frequency divider 550 includes a phase detector, an analog switch, a directional coupler and a power detector. The phase detector can be configured to receive the reference signal from the reference signal source 510 via the distribution tree 520. The analog switch can be configured to direct the phase synchronization signal received from the ring tap 544 to the directional coupler when the analog switch is closed. The directional coupler can be configured to provide the phase synchronization signal to the phase detector via a feedback network. The power detector can be configured to detect a signal power of an output of the directional coupler. Further, the phase detector can be further configured to provide a signal output that combines the reference signal and the phase synchronization signal, and the signal output is provided to a bandpass filter, an amplifier and the directional coupler to create the output of the directional coupler which corresponds to the common phase reference signal.

In one example, the analog regenerative frequency divider 550 can be configured to receive the phase synchronization signal from the ring tap 544 via the analog switch that is closed during a startup period of the phased array antenna system 500, and the phase synchronization signal can be received when the signal power of the output of the directional coupler is below a defined threshold. In another example, the analog regenerative frequency divider 550 can be configured to not receive the phase synchronization signal from the ring tap 544 when the analog switch is open after the startup period of the phased array antenna system 500, wherein the phase synchronization signal is not received when the signal power of the output of the directional coupler is above a defined threshold.

Figure 6:
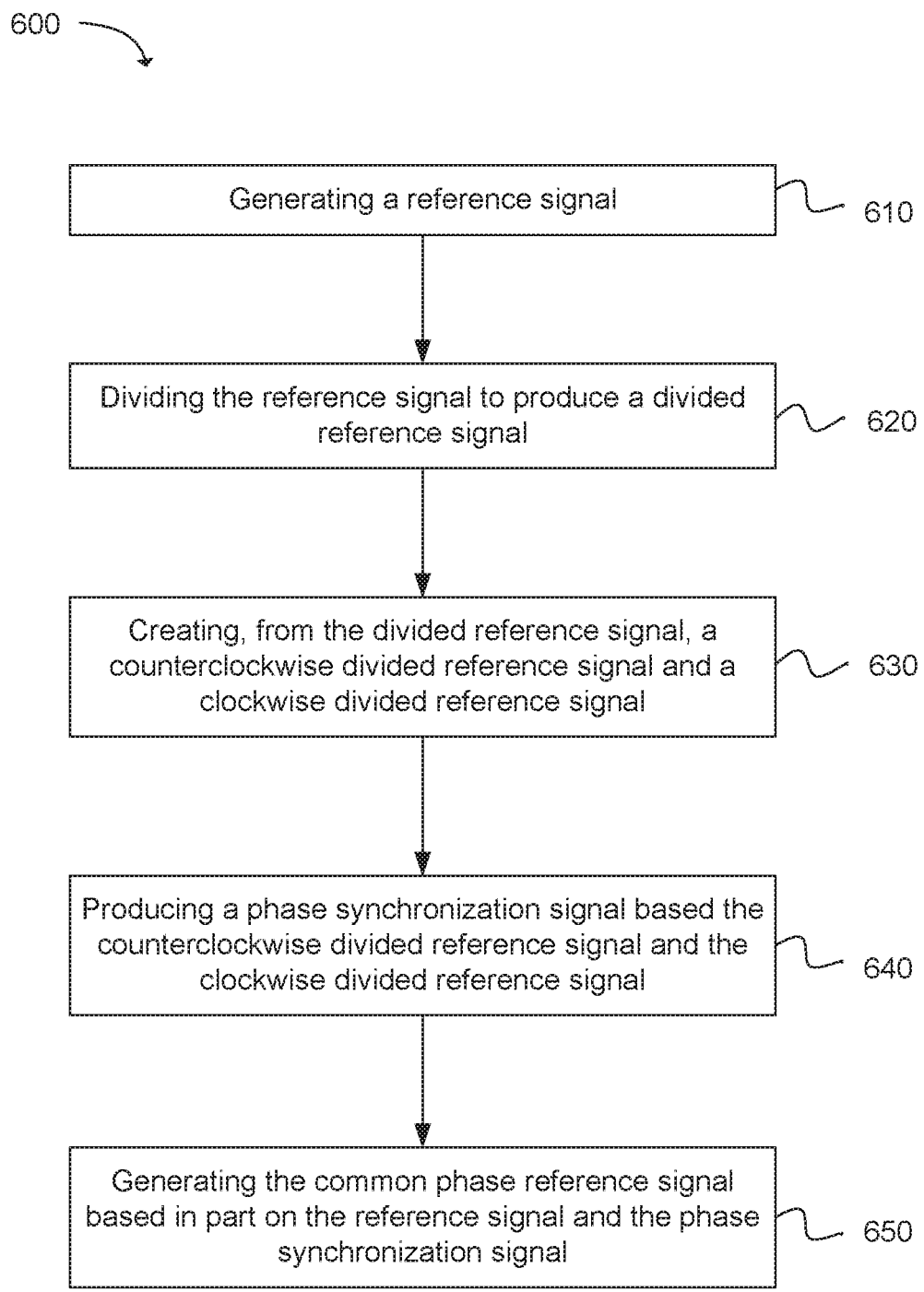
FIG. 6 depicts a method for generating a common phase reference signal for use in a phased array antenna system in accordance with an example.

FIG. 6 illustrates a flowchart of a method for generating a common phase reference signal for use in a phased array antenna system. The method can include generating a reference signal, as in block 610. The method can include dividing the reference signal to produce a divided reference signal, as in block 620. The method can include creating, from the divided reference signal, a counterclockwise divided reference signal and a clockwise divided reference signal, as in block 630. The method can include producing a phase synchronization signal based the counterclockwise divided reference signal and the clockwise divided reference signal, as in block 640. The method can include generating the common phase reference signal based in part on the reference signal and the phase synchronization signal, as in block 650. Further, the method can include generating an internal signal for controlling one or more antenna elements of the phased array antenna system using the common phase reference signal.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A reference signal distribution system, comprising:
   a power splitter configured to create, from a frequency-divided reference signal, a counterclockwise divided reference signal and a clockwise divided reference signal;
   at least one ring tap;
   a distribution ring operable to provide the counterclockwise divided reference signal to the ring tap, and to provide the clockwise divided reference signal to the ring tap, wherein the ring tap is configured to produce a phase synchronization signal based on the counterclockwise divided reference signal and the clockwise divided reference signal; and
   an analog regenerative frequency divider configured to produce a common phase reference signal based in part on the phase synchronization signal.

2. The reference signal distribution system of claim 1, wherein the analog regenerative frequency divider is further configured to directly or indirectly provide the common phase reference signal to a distributed receiver-exciter (DREX) of the reference signal distribution system.

3. The reference signal distribution system of claim 1, further comprising:
   a reference signal source configured to generate a reference signal; and
   a frequency divider configured to divide the reference signal to produce the frequency-divided reference signal.

4. The reference signal distribution system of claim 3, further comprising a distribution tree configured to receive the reference signal from the reference signal source and provide a copy of the reference signal to the analog regenerative frequency divider.

5. The reference signal distribution system of claim 1, wherein the frequency-divided reference signal has a frequency f/4, the counterclockwise divided reference signal has a frequency f/4, the clockwise divided reference signal has a frequency f/4, the phase synchronization signal has a frequency f/2, and the common phase reference signal has a frequency f/2, wherein f is a frequency in Hertz.

6. The reference signal distribution system of claim 1, wherein the frequency-divided reference signal has a frequency f/n, the counterclockwise divided reference signal has a frequency f/(2n), and the clockwise divided reference signal has a frequency f/(2n), wherein f is a frequency in Hertz and n is a positive integer.

7. The reference signal distribution system of claim 1, wherein distribution ring is a coaxial cable ring that is communicatively coupled to the ring tap.

8. The reference signal distribution system of claim 1, wherein the ring tap further comprises:
   a directional coupler configured to direct the counterclockwise divided reference signal and the clockwise divided reference signal to a mixer;
   the mixer configured to combine the counterclockwise divided reference signal and the clockwise divided reference signal to produce a combined divided reference signal; and
   a bandpass filter configured to filter the combined divided reference signal to produce the phase synchronization signal.

9. The reference signal distribution system of claim 1, wherein the analog regenerative frequency divider further comprises:
   an analog switch configured to direct the phase synchronization signal received from the ting tap to a directional coupler when the analog switch is closed; and
   the directional coupler configured to provide the phase synchronization signal to the phase detector via a feedback network;
   a power detector configured to detect a signal power of an output of the directional coupler; and
   a phase detector configured to provide a signal output based in part on a reference signal and the phase synchronization signal, and the signal output is provided to a bandpass filter, an amplifier and the directional coupler to create the output of the directional coupler which corresponds to the common phase reference signal.

10. The reference signal distribution system of claim 9, wherein the analog regenerative frequency divider is configured to receive the phase synchronization signal from the ring tap via the analog switch that is closed during a startup period of the reference signal distribution system, wherein the phase synchronization signal is received when the signal power of the output of the directional coupler is below a defined threshold.

11. The reference signal distribution system of claim 10, wherein the analog regenerative frequency divider is configured to not receive the phase synchronization signal from the ring tap when the analog switch is open after the startup period of the reference signal distribution system, wherein the phase synchronization signal is not received when the signal power of the output of the directional coupler is above a defined threshold.

12. The reference signal distribution system of claim 1, wherein the frequency-divided reference signal is created prior to the distribution ring to avoid a generation of phase ambiguities at an output of the ring tap.

13. A phased array antenna system, comprising:
a plurality of antenna elements;
a reference signal source configured to generate a reference signal;
a frequency divider configured to divide the reference signal to produce a frequency-divided reference signal;
a power splitter configured to create, from the frequency-divided reference signal, a counterclockwise divided reference signal and a clockwise divided reference signal;
at least one ring tap;
a distribution ring configured to provide the counterclockwise divided reference signal to the ring tap, and to provide the clockwise divided reference signal to the ring tap, wherein the ring tap is configured to produce a phase synchronization signal based the counterclockwise divided reference signal and the clockwise divided reference signal; and
an analog regenerative frequency divider configured to receive the phase synchronization signal and the reference signal and produce a common phase reference signal.

14. The phased array antenna system of claim 13, further comprising:
a distributed receiver-exciter (DREX) configured to directly or indirectly receive the common phase reference signal from the analog regenerative frequency divider and generate an internal signal using the common phase reference signal,
an antenna element in the plurality of antenna elements that is communicatively coupled to the DREX, wherein the antenna element is controlled using the internal signal generated at the DREX.

15. The phased array antenna system of claim 13, further comprising a distribution tree configured to receive the reference signal from the reference signal source and provide a copy of the reference signal to the analog regenerative frequency divider.

16. The phased array antenna system of claim 13, wherein the reference signal has a frequency f, the frequency divider is a f/4 frequency divider, the counterclockwise divided reference signal has a frequency f/4, the clockwise divided reference signal has a frequency f/4, the phase synchronization signal has a frequency f/2, and the common phase reference signal has a frequency f/2, wherein f is a frequency in Hertz.

17. The phased array antenna system of claim 13, wherein the ring tap further comprises:
a directional coupler configured to direct the counterclockwise divided reference signal and the clockwise divided reference signal to a mixer;
the mixer configured to combine the counterclockwise divided reference signal and the clockwise divided reference signal to produce a combined divided reference signal; and
a bandpass filter configured to filter the combined divided reference signal to produce the phase synchronization signal.

18. The phased array antenna system of claim 13, wherein the analog regenerative frequency divider further comprises:
a phase detector configured to receive the reference signal from the reference signal source via a distribution tree;
an analog switch configured to direct the phase synchronization signal received from the ring tap to a directional coupler when the analog switch is closed; and
the directional coupler configured to provide the phase synchronization signal to the phase detector via a feedback network; and
a power detector configured to detect a signal power of an output of the directional coupler,
wherein the phase detector is further configured to provide a signal output that combines the reference signal and the phase synchronization signal, and the signal output is provided to a bandpass filter, an amplifier and the directional coupler to create the output of the directional coupler which corresponds to the common phase reference signal.

19. The phased array antenna system of claim 17, wherein the analog regenerative frequency divider is configured to receive the phase synchronization signal from the ring tap via the analog switch that is closed during a startup period of the phased array antenna system, wherein the phase synchronization signal is received when the signal power of the output of the directional coupler is below a defined threshold.

20. The phased array antenna system of claim 19, wherein the analog regenerative frequency divider is configured to not receive the phase synchronization signal from the ring tap when the analog switch is open after completion of the startup period of the phased array antenna system, wherein the phase synchronization signal is not received when the signal power of the output of the directional coupler is above a defined threshold.

21. A method for generating a common phase reference signal, the method comprising:
generating a reference signal;
dividing the reference signal to produce a frequency divided reference signal;
creating, from the frequency-divided reference signal, a counterclockwise divided reference signal and a clockwise divided reference signal;
producing a phase synchronization signal based the counterclockwise divided reference signal and the clockwise divided reference signal; and
generating the common phase reference signal based in part on the reference signal and the phase synchronization signal.

22. The method of claim 21, further comprising generating an internal signal for controlling one or more antenna elements of a phased array antenna system using the common phase reference signal.

23. The method of claim 21, wherein the reference signal has a frequency f the frequency-divided reference signal has a frequency f/4, the counterclockwise divided reference signal has a frequency f/4, the clockwise divided reference signal has a frequency f/4, the phase synchronization signal has a frequency f/2, and the common phase reference signal has a frequency f/2, wherein f is a frequency in Hertz.

* * * * *